United States Patent [19]

Hegarty et al.

[11] 3,779,725

[45] Dec. 18, 1973

[54] COAL GASSIFICATION

[75] Inventors: William P. Hegarty; David L. Say, both of Wescoesville, Pa.

[73] Assignee: Air Products and Chemicals, Inc., Allentown, Pa.

[22] Filed: Dec. 6, 1971

[21] Appl. No.: 205,138

[52] U.S. Cl.................... 48/202, 48/215, 252/373
[51] Int. Cl. .............................................. C10j 3/00
[58] Field of Search..................... 48/202, 204, 210, 48/214, 215; 252/373

[56] References Cited
UNITED STATES PATENTS

| | | | |
|---|---|---|---|
| 2,840,462 | 6/1958 | Gorin | 48/202 X |
| 3,194,644 | 7/1965 | Gorin et al. | 48/202 X |
| 3,556,749 | 1/1971 | Spacil | 48/202 X |

Primary Examiner—Morris O. Wolk
Assistant Examiner—R. E. Serwin
Attorney—Ronald B. Sherer et al.

[57] ABSTRACT

A method for producing a synthetic pipeline gas by reacting a carbonaceous fuel in a gasifier to form a gas and thereafter subjecting the gas to additional process steps including a final cryogenic separation of high methane content gas for use as the pipeline gas.

10 Claims, 4 Drawing Figures

PATENTED DEC 18 1973

INVENTORS
William P. Hegarty
BY David L. Say

James C. Simmons
ATTORNEY

INVENTORS
William P. Hegarty
BY David L. Say
ATTORNEY

COAL GASSIFICATION

BACKGROUND OF THE INVENTION

This invention pertains to the production of a high methane content synthetic natural gas suitable for use as a substitute for natural gas. Various schemes have been proposed to produce synthetic natural gas from coal suitable as a substitute for natural gas for cooking, heating and the like.

In some prior art processes the coal is reacted in the presence of steam and oxygen to form a gas. This gas is then subjected to various process steps to remove hydrogen, hydrogen sulfide, carbon dioxide, carbon monoxide, in order to yield a high methane content synthetic natural gas. One such process is disclosed in U.S. Pat. No. 2,840,462; another is the process referred to as the "BCR Two-Stage Super-pressure Gasification Process" developed by Bituminous Coal Research Inc. of Monroeville, Pennsylvania and a third pertains to generation of a synthetic gas by electrothermal hydrogasification developed by the Institute of Gas Technology of Chicago, Illinois.

In the first two processes discussed above, there is a considerable amount of hydrogen and carbon monoxide that is generated along with methane in the gasifier and subsequently shift reacted over a suitable catalyst, to provide the necessary hydrogen to carbon monoxide ratio for the methanation step thereby producing substantially pure synthetic methane pipeline gas. The generation and shift conversion of these gases requires a large gasifier and large shift reactor and methanation units with catalyst beds that have to be replaced periodically.

The patented process replaces the methanation step with a low temperature separation; however, retaining the hydrogen carbon monoxide shift reactor. This process requires close control of temperature between the two zones of the gasifier itself.

BRIEF DESCRIPTION OF THE INVENTION

In order to overcome the problems with the prior art processes and to provide an improved process for manufacturing a synthetic pipeline gas, it has been discovered that the effluent from a gasifier can be subjected to an acid gas removal step followed by a low temperature separation of the synthetic pipeline gas from hydrogen and carbon monoxide with the hydrogen and carbon monoxide being returned to the gasifier as additional synthesis gas to react with the main source of carbonaceous material in the gasifier for continuous synthetic pipeline gas production. The recycle hydrogen-carbon monoxide synthesis gas reacts exothermically thereby providing a source of a portion of the heat for sustaining the gasifier operation.

Therefore, it is the primary object of this invention to provide an improved method of producing a synthetic pipeline gas.

It is another object of this invention to provide a method for producing a synthetic pipeline gas by gasification of carbonaceous materials.

It is a further object of this invention to provide a method employing low temperature gas separation and recycle to enhance gasification of carbonaceous materials.

DETAILED DESCRIPTION OF THE INVENTION

Figure 1:
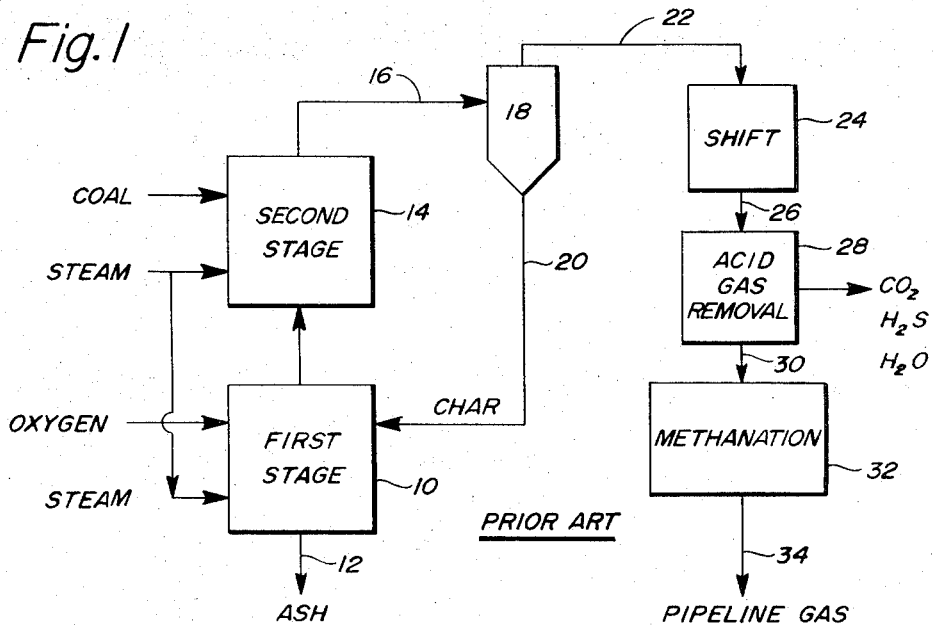
FIG. 1 is a schematic drawing of a prior art process for producing a synthetic pipeline gas.

There is shown in FIG. 1 a schematic drawing of the Bituminous Coal Research Inc. Two Stage Super-Pressure Gasification Process for manufacturing a synthetic pipeline gas which process will serve as illustrative of one application of the present invention. In this process steam, oxygen, and partially reacted carbonaceous material called char are fed into the first stage 10 of the gasifier operating at about 3100° F and about 72 atmospheres pressure to form a synthesis gas consisting essentially of carbon monoxide and hydrogen according to the reactions:

$$C + H_2O \rightarrow CO + H_2 \qquad 1$$

$$2C + O_2 \rightarrow CO \qquad 2$$

The addition of oxygen releases a large quantity of heat in situ by reacting with the carbon to form carbon monoxide. The first stage 10 has provision for removing slag and ash 12 generated by the reactions in either first stage 10 or the second stage 14. The synthesis gas consisting of primarily carbon monoxide and hydrogen together with carbon dioxide and steam is conducted to the second stage 14 of the gasifier where it is reacted at 1,700°F under 72.4 atmospheres pressure with steam and pulverized coal to form a gassifier effluent in conduit 16 consisting essentially of methane, water vapor, carbon monoxide, carbon dioxide, hydrogen sulfide and char.

The gasifier has an overall reaction according to the following:

$$2C + 2H_2O \rightarrow CO_2 + CH_4 \qquad 3$$

which is a combination of the reactions:

$$C + H_2O \rightarrow CO + H_2 \qquad 4$$

$$CO + H_2O \rightarrow CO_2 + H_2 \qquad 5$$

$$C + 2H_2 \rightarrow CH_4 \qquad 6$$

These last two reactions (5 and 6) are highly exothermic and do not go to completion at the high gasifier operating temperature whereas the reaction (4) is highly endothermic with the result that the total gasifier reactions are endothermic requiring a source of external heat for the gasifier. Heat addition at the operating environment of the gasifier is difficult because of the high pressure and temperature. One method of achieving the required heating is by the reaction of oxygen with carbon as described above.

The effluent in conduit 16 is passed to a separation unit 18 where the solid char particles are removed through conduit 20 and returned to the first stage 10 of the gassifier for producing the synthesis gas as hereinbefore described. The gaseous effluent from separation unit 18 is conducted through conduit 22 to a shift reactor 24 where the hydrogen to carbon monoxide ratio is shifted over a fixed bed catalyst to about 3 to 1 for the subsequent methanation step. After shift reaction the effluent from reactor 24 is passed through conduit 26 to an acid gas removal unit 28 where carbon dioxide, water vapor and hydrogen sulfide are removed. The remaining gas consisting essentially of methane, carbon monoxide and hydrogen is fed to the methanation unit 32 through conduit 30. The carbon monoxide and hydrogen are reacted over a nickel catalyst to form methane which is taken from the methanation unit 32 as at 34 and sent to the pipeline for distribution to consumers.

The improved process of this invention in one embodiment comprises the elimination of the shift conversion and methanation steps, relying upon low temperature separation of the methane from hydrogen and carbon monoxide and recycling the latter two gases to the second stage of the gasifier to make up additional synthesis gas and for improved heat input to the gasifier.

Figure 2:
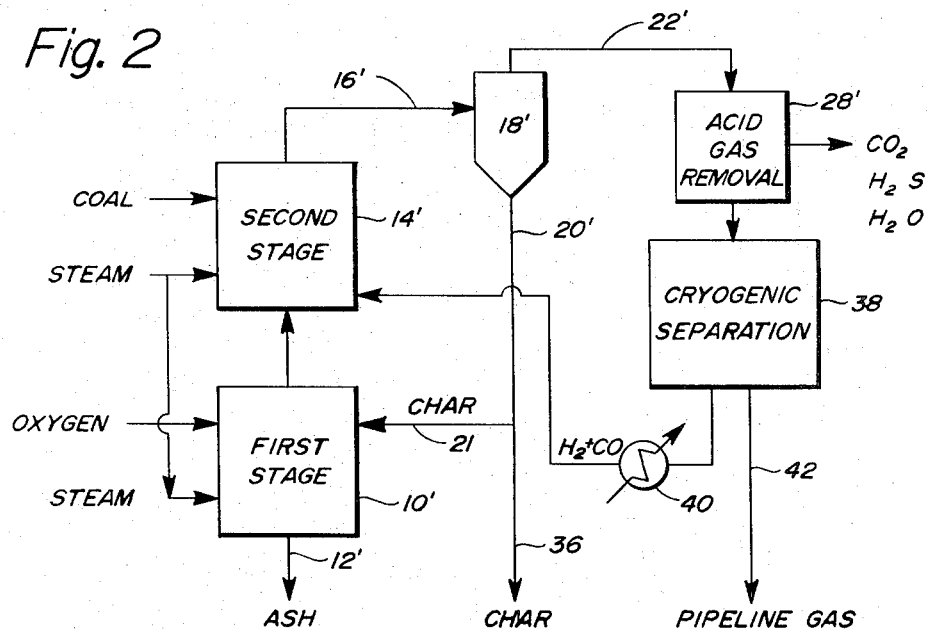
FIG. 2 is a schematic drawing of a process for producing a synthetic pipeline gas according to the present invention.

Referring to FIG. 2 the gasifier is the same as described in relation to FIG. 1 having a first stage 10' and second stage 14' with ash removal means 12'. The reactions in the first stage 10' are identical and the overall reaction in the second stage 14' is identical resulting in an effluent in conduit consisting essentially of char, $CO_2$, CO, $H_2$, $H_2S$, and $CH_4$, the effluent being subjected to a char removal in unit 18' with some of the char being recycled to the first stage 10' of the gasifier via 20' and 21 with excess char, as will hereinafter be described, being removed to a storage area through conduit 36. The gasifier effluent is then passed through conduit 22' to an acid gas removal unit 28' where $CO_2$, $H_2S$, and $H_2O$ are removed. The remaining gas is sent via conduit 30' to a cryogenic separation unit 38 wherein the methane is liquefied and separated from the $H_2$ and CO. The $H_2$ and CO are warmed in heater 40 and sent to the second stage 14' of the gassifier for reaction with steam, coal and synthesis gas from the first stage 10' to form the gasifier effluent in conduit 16' The methane is warmed by heat exchange and removed via conduit 42 and sent to the pipeline for distribution.

Figure 3:
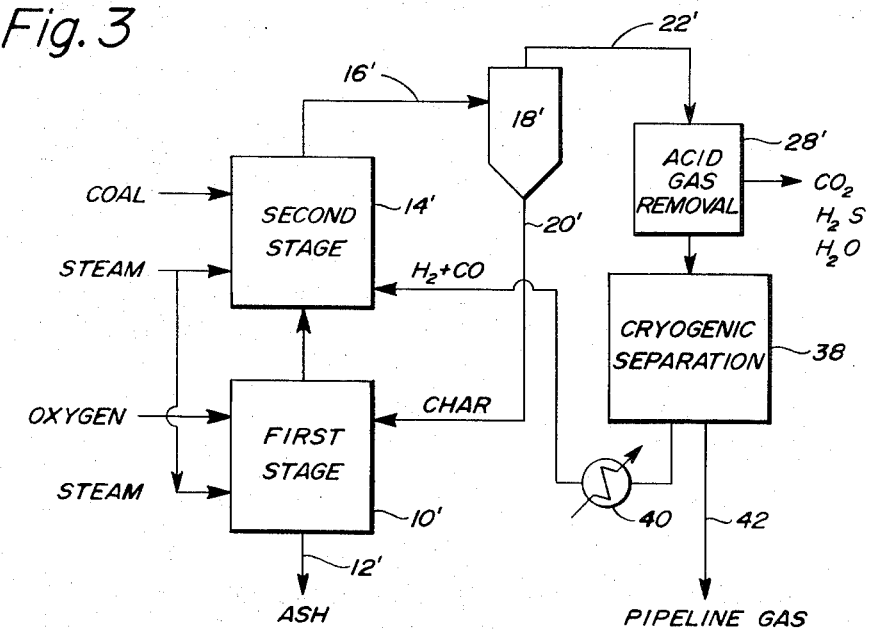
FIG. 3 is a schematic drawing of an alternate embodiment of the process of FIG. 2.

Shown is FIG. 3 is the schematic flow diagram for the process of FIG. 2 except that no excess char is generated and all is recycled to the first stage 10' of the gasifier.

Figure 4:
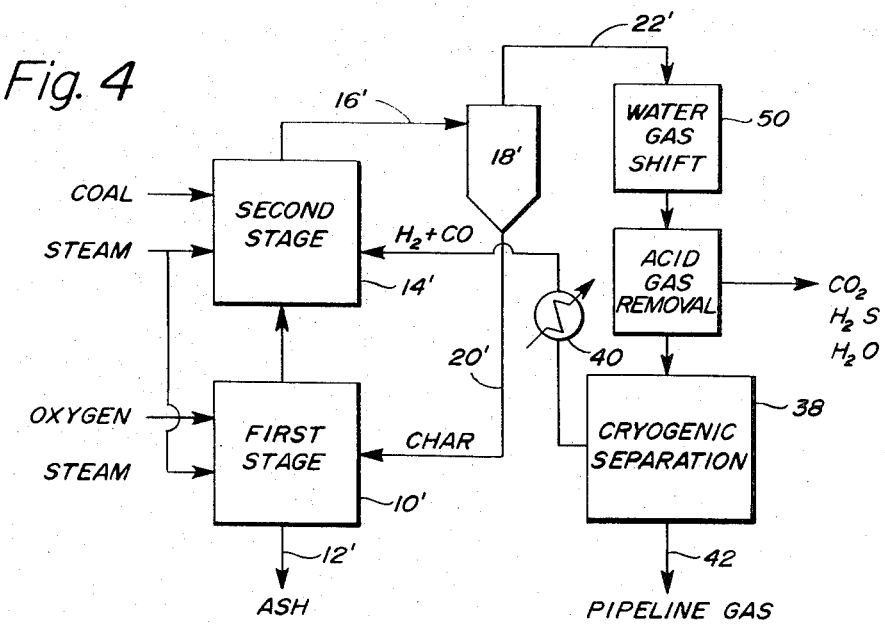
FIG. 4 is a schematic drawing of another embodiment of present invention.

In FIG. 4 an alternate embodiment of the invention is shown wherein there is included a reactor 50 between the char separator 18' and the acid gas removal unit 28' for shifting over a suitable catalyst, the carbon monoxide to hydrogen for recycle to the gasifier according to the reaction:

$$CO + H_2O \rightarrow CO_2 + H_2$$

The use of the water gas shift reaction effects certain process benefits as will hereinafter be shown.

The following examples will quantitatively illustrate the effect on gassifier heat requirements of recycling to extinction gasifier hydrogen and carbon monoxide. The examples are based upon a computer study of the BCR process reported in a paper by E. E. Donath and R. A. Glenn entitled "BCR Two-Stage Super-Pressure Coal Gasification Process" presented at the 154th National ACS Meeting in Chicago, Illinois, Sept. 11–15, 1957. The study was based on a reactor model that made the following assumptions.

1. Reaction rates are fast and thermodynamic equilibrium is essentially achieved in the gasifier effluent for the shift and methanation reactions. Solid carbon activity is assumed equal to 1.

2. Thermodynamic equilibrium was not achieved for the carbon steam reaction in the gasifier effluent. Instead when the actual effluent concentrations were substituted into the equilibrium constant equation the calculated constant was found to be 42 percent of the actual equilibrium constant.

3. No excess char is produced, i.e., the carbon charge to the gasifier is completely consumed.

4. Gasifier heat losses were fixed at 250 BTU per pound of coal charged.

5. Oxygen was charged as required to maintain the gasifier heat balance at the selected operating conditions.

6. For the purpose of calculation Run 8014–BKC 27, a typical run based on Pittsburgh coal feed was selected from the subject report as the basis for the following examples.

The following examples I through IV set forth a material balance for 100 pounds of coal processed respectively as shown schematically in FIG. 1, FIG. 2, FIG. 3 and FIG. 4. In each of the following examples process point A is the coal feed to the second stage of the gassifier, point B is the total steam feed to the gasifier, point C is the oxygen feed to the first stage of the gasifier, point D is the effluent in conduit 22 or 22', point E is the ash at 12 or 12' from the first stage and point F is the excess char for the process of FIG. 2, and point G is the recycle gas at the exit of heater 40 for the process of FIG. 4.

EXAMPLE I

| | Process Point | | | | |
|---|---|---|---|---|---|
| | A | B | C | D | E |
| Temp. (°F) | 400 | 1,000 | 620 | 1,715 | 3,119 |
| Coal (lb.) (MAF)* | 100 | | | | |
| Ash (lbs.) | 7.7 | | | | 7.7 |
| Composition (moles) | | | | | |
| CO | | | | 3.47 | |
| $H_2S$ | | | | 0.08 | |
| $CH_4$ | | | | 1.17 | |
| $H_2$ | | | | 3.90 | |
| $N_2$ | | | | 0.06 | |
| $CO_2$ | | | | 2.39 | |
| $H_2O$ | | 7.30 | | 3.90 | |
| $O_2$ | | | 2.22 | | |
| Total Moles | | 7.30 | 2.22 | 14.97 | |

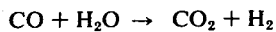*MAF—Moisture and ash free

EXAMPLE II

| | Process Point | | | | | |
|---|---|---|---|---|---|---|
| | A | B | C | D | E | F |
| Temp. (°F) | 400 | 1,000 | 620 | 1,715 | 3,119 | 1,715 |
| Coal (lbs.) (MAF)* | 100 | | | | | |
| Ash (lbs.) | | | | | 7.7 | |
| Char (lbs.) | 7.7 | | | | | 28.0 |
| Composition | | | | | | |

| (moles) | | | | | |
|---|---|---|---|---|---|
| CO | | | 4.09 | | |
| H₂S | | | 0.08 | | |
| CH₄ | | | 2.33 | | |
| H₂ | | | 6.52 | | |
| N₂ | | | 0.06 | | |
| CO₂ | | | 2.37 | | |
| H₂O | 7.30 | | 5.49 | | |
| O₂ | | 1.29 | | | |
| Total moles | 7.30 | 1.29 | 20.94 | 7.7 | 28.0 |

EXAMPLE III

| | Process Point | | | | |
|---|---|---|---|---|---|
| | A | B | C | D | E |
| Temp. (°F) | 400 | 1,000 | 620 | 1,715 | 3,119 |
| Coal (lbs.) (MAF)* | 100 | | | | |
| Ash (lbs.) | 7.7 | | | | 7.7 |
| Composition (moles) | | | | | |
| CO | | | | 6.27 | |
| H₂S | | | | 0.08 | |
| CH₄ | | | | 3.28 | |
| H₂ | | | | 9.43 | |
| N₂ | | | | 0.06 | |
| CO₂ | | | | 3.75 | |
| H₂O | | 11.91 | | 8.19 | |
| O₂ | | | 1.72 | | |
| Total moles | | 11.91 | 1.72 | 31.06 | |

*MAF—moisture and ash free

EXAMPLE IV

| | Process Point | | | | | |
|---|---|---|---|---|---|---|
| | A | B | C | D | E | F |
| Temp. (°F) | 400 | 1,000 | 620 | 1,715 | 3,119 | 1,000 |
| Coal (lbs.) MAF* | | | | | | |
| Ash (lbs.) | 7.7 | | | | 7.7 | |
| Composition (moles) | | | | | | |
| CO | | | | 2.59 | | |
| H₂S | | | | 0.08 | | |
| CH₄ | | | | 3.40 | | |
| H₂ | | | | 7.52 | | |
| N₂ | | | | 0.06 | | |
| CO₂ | | | | 1.04 | | |
| H₂O | | 5.75 | | 4.40 | | |
| O₂ | | | 1.49 | | | |
| Total moles | | 5.75 | 1.49 | 19.09 | | 10.11 |

The critical aspects of the foregoing examples are set forth in Table I.

TABLE I

| | Example Number | | | |
|---|---|---|---|---|
| | I | II | III | IV |
| Coal Feed (lbs.) | 100 | 100 | 100 | 100 |
| O₂ Feed (lbs.) | 71 | 41.3 | 55.0 | 47.7 |
| Steam Feed (lbs.) | 131.4 | 131.4 | 214.4 | 103.5 |
| Char (lbs.) | — | 28.0 | — | — |
| Equivalent CH₄ moles | 3.01 | 2.33 | 3.28 | 3.40 |
| O₂ required[a] | 23.59 | 17.72 | 16.78 | 14.03 |
| Coal required[a] | 33.22 | 42.92 | 30.49 | 29.41 |
| Steam Input[b] | 4.36 | 5.65 | 6.55 | 3.04 |

[a] pounds per mole equivalent of CH₄
[b] pounds per mole equivalent of CH₄ × 10
*MAF—Moisture and Ash Free In the above table the equivalent moles of CH₄ in Example I equals the moles of CH₄ in the gasifier effluent plus one fourth the moles of CO + H₂, whereas for examples II, III, and IV the equivalent moles of CH₄ equals the moles of CH₄ in the gasifier effluent.

To illustrate the effect of recycling H₂ and CO to the gasifier, Example II was developed. Coal feed and steam rate for Example II are the same as for Example I. As shown on FIG. 2, shifting and methanation reaction steps down-stream of the gasifier are eliminated. The gassifier effluent is fed to a cryogenic unit in which the H₂ and CO are separated from the product methane at low temperatures and recycled to the gasifier.

The calculation results for Example II show that when, as in Example I, the water gas shift and methanation reactions are in equilibrium, when the carbon steam reaction approach factor is 42%, and when heat losses are the same as in Example I, all the carbon is not consumed in the gasifier. As a result, a by-product char stream is produced. Reference to Table I shows that compared to Example I, the oxygen consumption is reduced from 71 to 41.3 lbs. per 100 lbs. of coal charged to the gasifier. On an equivalent CH₄ gasifier product basis, comparison of Example I and II indicates that the effect of the H₂ and CO recycle is to reduce the oxygen requirement by 24.9 percent. Because of the by-product char production, the coal requirement per mole of equivalent CH₄ is increased by 29.2 percent. Steam usage is increased by 30 percent. Note that when H₂ and CO are completely recycled, the equivalent CH₄ product is equal to that produced in the gasifier. Because by-product char may not be desirable, example III was developed. In Example III, the steam rate is increased over that of examples I and II to give complete consumption of carbon in the gasifier. Example III heat losses are the same as in example I and II and, as with examples I and II equilibrium is achieved for the water gas shift and methanation reactions and an approach of 42 percent is achieved for the carbon-steam reaction. As summarized in Table I, on an equivalent CH₄ product basis, compared to the base case for Example I, oxygen consumption is reduced 28.9 percent, coal consumption is reduced 8.2%, while steam consumption is increased 50 percent. As shown in Table I, oxygen, coal and steam requirements for Example IV are all less than for the other cases, including Example III. Also, compared with Example III, the gasifier effluent (Process Point D) flow rate is reduced in Example IV. This would reduce the required size and capital cost of the acid-gas removal towers. Additionally, elimination of the carbon monoxide makes the cryogenic separation in Example IV easier than in Examples II and III with a resultant decrease in power requirements. These advantages for Example IV should more than off-set the added requirements and costs for shift conversion.

The foregoing recycle process is applicable to other gasifiers such as those of the Institute of Gas Technology, the Molten Salt Process of the M. W. Kellogg Company, the Consolidation Coal Company CO₂ Acceptor Process, the United States Bureau of Mines Synthane Process, and the Lurgi, A.G. Moving Bed Process, the examples being shown only for the BCR Process as illustrative of the invention. Applying the method of the invention results in decreased oxygen consumption in the BCR, Bureau of Mines and Lurgi processes, reduces the salt circulation requirement in the Kellogg Process, decreases the lime circulation requirement for the Consolidation Coal Company Process, reduces the electro-thermal heating requirement for the IGT Electrothermal Hydrogasification Process, and reduces the synthesis gas requirement of the IGT Steam-Iron process with significant process economies realized in each case.

Having thus described our invention what is desired to be secured by Letters Patent of the United States is set forth in the appended claims.

We claim:

1. In a method for producing a pipeline gas by reacting a carbonaceous feed in the presence of steam at elevated temperature and pressure in a gasification vessel, the improvement which comprises the steps of:
   operating the gasification vessel so that the carbonaceous feed is raised to the reaction temperature for both gasification and hydrogenation by contacting the carbonaceous feed with a hot gaseous mixture produced by the limited combustion of partially reacted carbonaceous material with oxygen and steam to produce a gasifier effluent containing a mixture of methane, hydrogen, carbon monoxide, carbon dioxide, hydrogen sulfide, and water vapor;

removing from said effluent carbon dioxide, hydrogen sulfide, and water vapor;

liquefying said methane and separating said methane from said hydrogen and carbon monoxide;

warming said hydrogen and carbon monoxide mixture and injecting said mixture into said gasification vessel; whereby carbon monoxide-hydrogen recycle gas reacts exothermically with the carbonaceous feed material in the gasifier to provide a portion of the heat required to sustain gasifier operation, to eliminate any requirements for heat balance in a multi-stage gasification process and providing overall process economies.

2. In a method for producing a pipeline gas by reacting a carbonaceous feed in the presence of steam and oxygen at elevated temperature and pressure in a gasification vessel, the improvement which comprises the steps of:

operating the gasification vessel so that the carbonaceous feed is raised to the reaction temperature for both gasification and hydrogenation by contacting the carbonaceous feed with a hot gaseous mixture produced by the limited combustion of partially reacted carbonaceous material with oxygen and steam to produce a gasifier effluent containing a mixture of methane, hydrogen, carbon monoxide, carbon dioxide, hydrogen sulfide, water vapor and partially reacted solid carbonaceous particles;

separating out the partially reacted solid carbonaceous particles and returning a portion of said particles to said gasification vessel;

removing from said effluent carbon dioxide, hydrogen sulfide and water vapor;

liquefying said methane and separating said methane from said hydrogen and carbon monoxide;

warming said hydrogen and carbon monoxide mixture injecting said mixture into said gasification vessel; whereby the carbon monoxide-hydrogen recycle gas reacts exothermically with the carbonaceous feed material in the gasifier to provide a portion of the heat required to sustain gasifier operation and reduce the overall oxygen required to achieve a given volume of gasifier effluent.

3. A method according to claim 2 wherein all of said separated carbonaceous material is returned to said gasification vessel.

4. A method according to claim 2 wherein said gasification vessel has discrete operating stages, a first stage for forming a hot synthesis gas by reacting recycled carbonaceous material, oxygen, and steam and a second stage for reacting the carbonaceous fuel with the synthesis gas and steam, said recycled hydrogen and carbon monoxide injected into said second stage.

5. A method according to claim 2 wherein the effluent from the gasifier vessel is passed through a carbon monoxide, hydrogen shift reactor immediately after the solid carbonaceous material is separated from said stream.

6. In a process for producing a pipeline gas by reacting coal in the presence of steam and oxygen at elevated temperature and under super-atmospheric pressure in a two-stage gasifier to produce a gas mixture the improvement which comprises:

combusting partially reacted carbonaceous material with oxygen in the presence of steam in a first stage of the gasifier at an elevated temperature, said temperature being selected to suppress the formation of methane in the first stage, and high pressure to form a hot synthesis gas;

adding the synthesis gas to a mixture of finely divided coal and steam into the second stage of the gasifier to form a gasifier effluent consisting of solid carbonaceous particles suspended in a gas consisting of a mixture of methane, hydrogen, carbon monoxide, carbon dioxide, hydrogen sulfide, and water vapor;

separating out the coal particles and returning a portion of said particles to the first stage of the gasifier as the source of partially reacted carbonaceous material;

subjecting the gaseous remainder of the effluent to an acid gas removal process wherein carbon dioxide, hydrogen sulfide, and water vapor are removed and thereafter;

liquefying said methane and separating said methane from said hydrogen and said carbon monoxide to produce a pipeline gas;

warming said hydrogen and carbon monoxide mixture and injecting said mixture into the second stage of said gasifier; whereby the carbon monoxide-hydrogen recycle gas reacts exothermically with the coal in the gasifier to provide a portion of the heat required to sustain gasifier operation, heat balance between the stages is eliminated and the overall oxygen requirement is reduced thereby increasing the overall process efficiency.

7. A method according to claim 6 wherein all of said solid carbonaceous particles separated from said gasifier effluent is returned to the gasifier and reacted to form the hot synthesis gas.

8. A method according to claim 6 wherein the first stage of said gasifier is operated at a temperature in excess of 2600° F and at a pressure of greater than 70 atmosphere.

9. A method according to claim 6 wherein the second stage of said gasifier is operated at a minimum temperature of 1700° F and a pressure greater than 70 atmosphere.

10. A method according to claim 6 wherein the gaseous portion of the gasifier effluent is passed through a carbon monoxide hydrogen shift reactor prior to the acid gas removal step.

* * * * *

PO-1050
(5/69)

UNITED STATES PATENT OFFICE
CERTIFICATE OF CORRECTION

Patent No. __3,779,725__   Dated __December 18, 1973__

Inventor(s) __William P. Hegarty et al.__

It is certified that error appears in the above-identified patent and that said Letters Patent are hereby corrected as shown below:

IN THE TITLE:

The title "Coal Gassification" should read

--Coal Gasification--.

IN THE SPECIFICATION:

Column 2, line 48

$$2C + 2H_2O \longrightarrow CO_2 + CH_4 \; tm3 \quad \text{should read}$$

$$2C + 2H_2O \longrightarrow CO_2 + CH_4 \qquad 3$$

Signed and sealed this 10th day of September 1974.

(SEAL)
Attest:

McCOY M. GIBSON, JR.　　　　　　C. MARSHALL DANN
Attesting Officer　　　　　　　　Commissioner of Patents